US007956567B2

(12) United States Patent
Ryu

(10) Patent No.: US 7,956,567 B2
(45) Date of Patent: Jun. 7, 2011

(54) MOTOR DRIVE CONTROL DEVICE AND IMAGE FORMING APPARATUS

(75) Inventor: Gunmun Ryu, Osaka (JP)

(73) Assignee: Kyocera Mita Corporation (JP)

( * ) Notice: Subject to any disclaimer, the term of this patent is extended or adjusted under 35 U.S.C. 154(b) by 537 days.

(21) Appl. No.: 12/197,375

(22) Filed: Aug. 25, 2008

(65) Prior Publication Data

US 2009/0058348 A1 Mar. 5, 2009

(30) Foreign Application Priority Data

Sep. 4, 2007 (JP) ................................ 2007-229189

(51) Int. Cl.
*G05B 11/42* (2006.01)

(52) U.S. Cl. ......................... 318/610; 318/599; 318/621

(58) Field of Classification Search .................. 318/610, 318/599, 621, 632, 568.22, 600, 601, 603; 388/804

See application file for complete search history.

(56) References Cited

U.S. PATENT DOCUMENTS 6,812,668 B2 * 11/2004 Akiyama ..................... 318/610

FOREIGN PATENT DOCUMENTS

JP 2003-18880 1/2003

* cited by examiner

*Primary Examiner* — Karen Masih

(74) *Attorney, Agent, or Firm* — Gerald E. Hespos; Michael J. Porco

(57) ABSTRACT

A motor drive control device for controlling a rotational speed of a motor includes: a motor driver for rotationally driving a motor; a correction amount calculating section for detecting a rotational speed of an output of the motor in accordance with an alternate current signal outputted from an FG sensor and detecting a rotational position of a photoconductive drum, which is rotated by a rotational drive force of the motor, in accordance with a pulse outputted from an encoder; a speed controller for generating a speed control signal corresponding to a total correction amount, which is a sum of a correction amount calculated in the correction amount calculating section based on a rotational speed of the motor and a correction amount calculated based on a rotational position of the photoconductive drum, and outputting the generated speed control signal to the motor driver.

9 Claims, 4 Drawing Sheets

MOTOR DRIVE CONTROL DEVICE AND IMAGE FORMING APPARATUS

BACKGROUND OF THE INVENTION

1. Field of the Invention

The present invention relates to a motor drive control device and an image forming apparatus. More particularly, it relates to a control of rotationally driving a driven member in a predetermined state.

2. Description of the Related Art

Conventionally, in image forming apparatuses such as a copying machine and a printer, a high accuracy has been requested in a speed of a traction motor used for rotationally driving a photoconductive drum. Accordingly, a drum rotational speed outputted from an encoder mounted to a driving shaft of the photoconductive drum and a motor rotational speed outputted from an encoder mounted to an output shaft of a motor as a drive power source of the photoconductive drum are fed back, so that a speed control with respect to a traction motor is performed. Such rotational driving device has been proposed in, for example, Japanese Patent Unexamined Publication No. 2003-18880 (patent document 1).

However, a motor rotational speed outputted from an encoder mounted to an output shaft of the motor includes only an effect such as a torque ripple which occurs alone in a traction motor, and slipping and the like which occurs in a traction decelerator is disregarded. Therefore, it is difficult to accurately control a rotational speed of the motor to be a target speed. Further, the drum rotational speed outputted from the encoder mounted to the driving shaft of the photoconductive drum includes an effect such as a torque ripple which occurs alone in the traction motor and a non-linear element such as slipping which occurs in the traction decelerator. Accordingly, it is difficult to cancel those elements from the output by filtering and use the same, and a rotational speed control with respect to the photoconductive drum becomes unstable. Therefore, it is difficult to realize an accurate rotational speed control with the motor rotational speed control by merely feeding back the motor rotational speed and the drum rotational speed.

In the case of the rotational driving device shown in the patent document 1, the drum rotational speed is fed back, and amplification at a predetermined gain based on the difference with respect to the target speed is performed to perform a speed correction. After that, the motor rotational speed is further fed back to the corrected signal, and amplification at a predetermined gain based on the difference with respect to the target speed is performed, so that a final speed control signal to be outputted to a motor driver is generated. However, if the speed control signal is generated by the two-step correction in accordance with the feedbacks of the drum rotational speed and the motor rotational speed, oscillation is likely to occur, and the generated speed control signal is not stable, so that it is difficult to perform a rotational drive control with respect to the photoconductive drum stably.

SUMMARY OF THE INVENTION

An object of the present invention is to solve the problem described above and realize a motor drive control capable of stably rotating a driven member by making the oscillation at a time of executing a feedback control be unlikely to occur and making it possible to generate a stable speed control signal.

In other words, the present invention includes a motor drive control device for controlling a rotational speed of a motor, including: a motor driving section for rotationally driving the motor; a motor rotational speed detector for detecting a rotational speed of the motor; a driven member rotational position detector for detecting a rotational position of a driven member which is rotated by a rotational drive force applied by the motor; a correction amount calculating section for calculating a total correction amount, which is a sum of a correction amount calculated based on a rotational speed of the motor detected by the motor rotational speed detector and a correction amount calculated based on a rotational position of the driven member detected by the driven member rotational position detector; and a speed controller for generating a speed control signal corresponding to a total correction amount calculated by the correction amount calculating section, and outputting the generated speed control signal to the motor driving section.

These and other objects, features and advantages of the present invention will become more apparent upon reading of the following detailed description along with the accompanied drawings.

DETAILED DESCRIPTION OF THE PREFERRED EMBODIMENTS

Hereinafter, a motor drive control device and an image forming apparatus in accordance with an embodiment of the present invention will be described with reference to the drawings.

Figure 1:
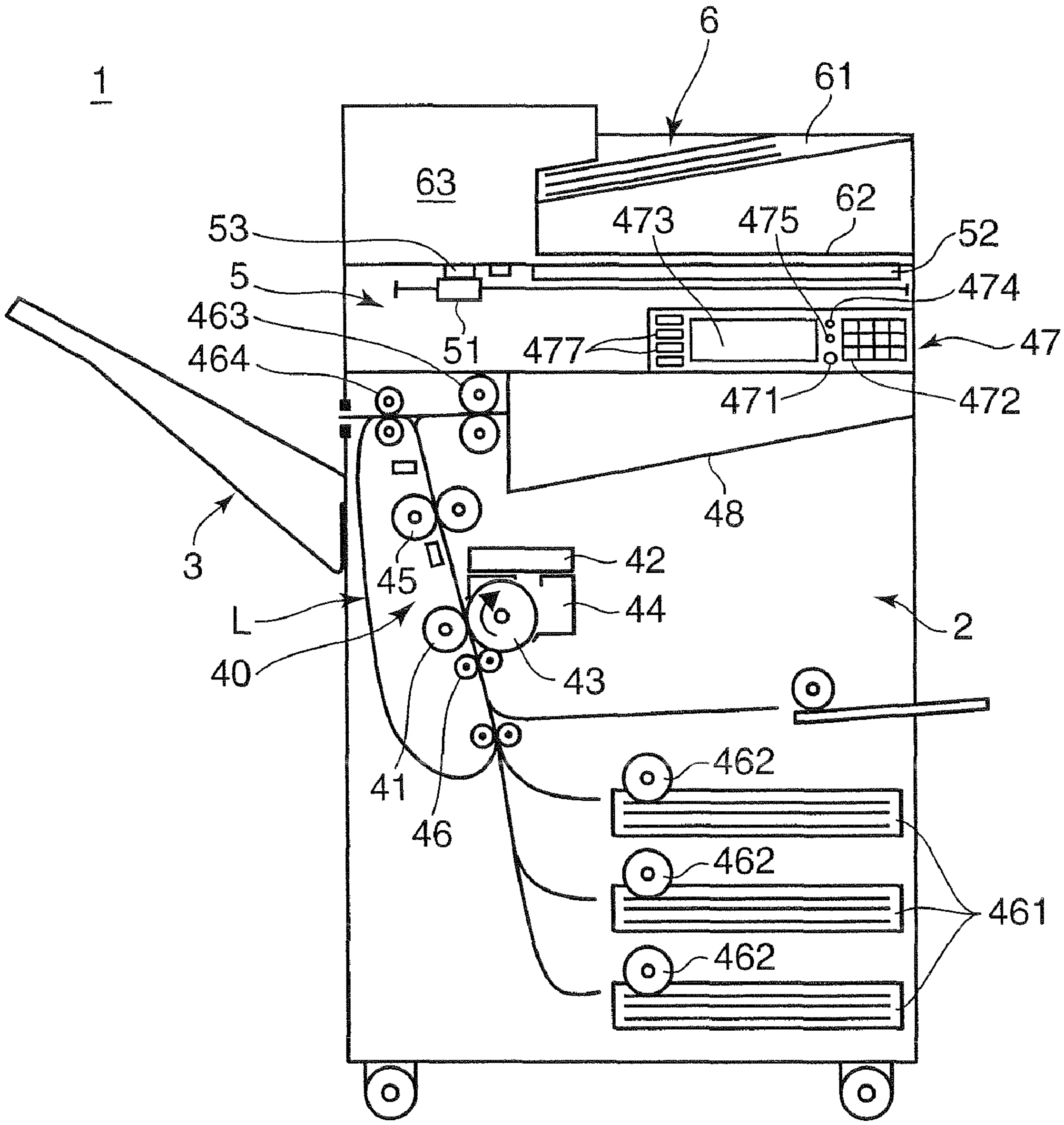
FIG. 1 is a side view schematically showing an internal configuration of a complex machine which is an example of an image forming apparatus in accordance with an embodiment of the present invention.

FIG. 1 is a side view schematically showing an internal configuration of a complex machine which is an example of an image forming apparatus in accordance with an embodiment of the present invention. The complex machine 1 has functions such as a copying function, a printer function, a scanner function, and a facsimile function. This complex machine 1 includes main body 2, a stack tray 3 provided on a left side of the main body 2, a document reading section 5 provided in an upper portion of the main body 2, and a document feeding section 6 provided on top of the document reading section 5.

Further, an operating section 47 is provided on a front portion of the complex machine 1. The operating section 47 includes a start key 471 for allowing a user to input a print executing instruction, numerical keys 472 for inputting the number of prints and the like, a display portion 473 adapted to display operation guide information of various copying operations and composed of a liquid crystal panel and the like having a touch panel function for inputting those various settings, a reset key 474 for resetting contents of settings set through the display section 473, a stop key 475 for stopping a printing (image-forming) operation under execution, and a function switching key 477 for switching functions between the copying function, the printer function, the scanner function, and the facsimile function.

The document reading section 5 has a scanner section 51 composed of a CCD (Charge Coupled Device) sensor and an exposure lamp, a document holder 52 composed of a transparent member such as glass, and a document reading slit 53. The scanner section 51 is so configured as to be movable by an unillustrated driving portion. When the scanner section 51 reads a document placed on the document holder 52, it is moved along a document surface at positions facing the document holder 52 and outputs image data obtained by scanning the document image to a controller 100 (refer to FIG. 2). Further, when the scanner section 51 reads a document fed by the document feeding section 6, it is moved to a position facing a document reading slit 53 to obtain an image of a document through the document reading slit 53 in synchronization with a document conveying operation performed by the document feeding section 6, and then outputs the image data to the controller 100.

The document feeding section 6 has a document holding portion 61 for holding a document, a document discharging portion 62 for discharging a document whose image is read, and a document conveying mechanism 63. The document conveying mechanism 63 has sheet feeding rollers (unillustrated) and conveying rollers (unillustrated) which are adapted to convey documents placed on the document holding portion 61 one after another to the position facing the document reading slit 53 and discharge the sheets to the document discharging portion 62. Further, the document conveying mechanism 63 has a sheet reversing mechanism (unillustrated) adapted to reverse front and back sides of the document and convey the document to the position facing the document reading slit 53 again so that images on both sides of the document can be read by the scanner section 51 through the document reading slit 53.

Further, the document feeding section 6 is rotatably provided with respect to the main body 2 so that its front surface side can be moved upward. By moving the front surface side of the document feeding section 6 upward to open an upper surface of the document holder 52, an operator can place a document to be read, for example, an opened book and the like on the upper surface of the document holder 52.

The main body 2 includes a plurality of sheet-feeding cassettes 461, sheet feeding rollers 462 adapted to convey recording sheets one after another from the sheet-feeding cassettes 461 to a recording section 40, and the recording section 40 adapted to form an image onto the recording sheet conveyed from the sheet feeding cassette 461.

The recording section 40 has an optical unit 42 adapted to output a laser light in accordance with image data obtained by the scanner section 51 to allow a photoconductive drum 43 to be exposed to the laser light, a developing section 44 adapted to form a toner image on the photoconductive drum 43, a transferring roller 41 adapted to transfer the toner image formed on the photoconductive drum 43 to the recording sheet, a fixing section 45 adapted to heat the recording sheet, onto which the toner image is transferred, to fix the toner image onto the recording sheet, and a pair of conveying rollers 463, 464 which are provided on a sheet conveying passage in the recording section 40 and adapted to convey the recording sheet to the stack tray 3 or a sheet discharging tray 48.

A motor drive control device 10 (FIG. 2) in accordance with an embodiment of the present invention is provided in the complex machine 1 to control driving of a motor as a drive power source for rotating the photoconductive drum 43 and the transferring roller 41.

Further, in a case of forming images on both sides of the recording sheet, the recording section 40 forms an image on one side of the recording sheet, and thereafter the recording sheet is between the pair of conveying rollers 463 on the side of the sheet discharging tray 48. In this state, the pair of conveying rollers 463 are reversely rotated to switch back the recording sheet. Then, the recording sheet is conveyed to the sheet conveying passage L so that it is conveyed again to an upstream area of the recording section 40. After the recording section 40 forms an image on the other side, the recording sheet is discharged to the stack tray 3 or the sheet discharging tray 48.

Figure 2:
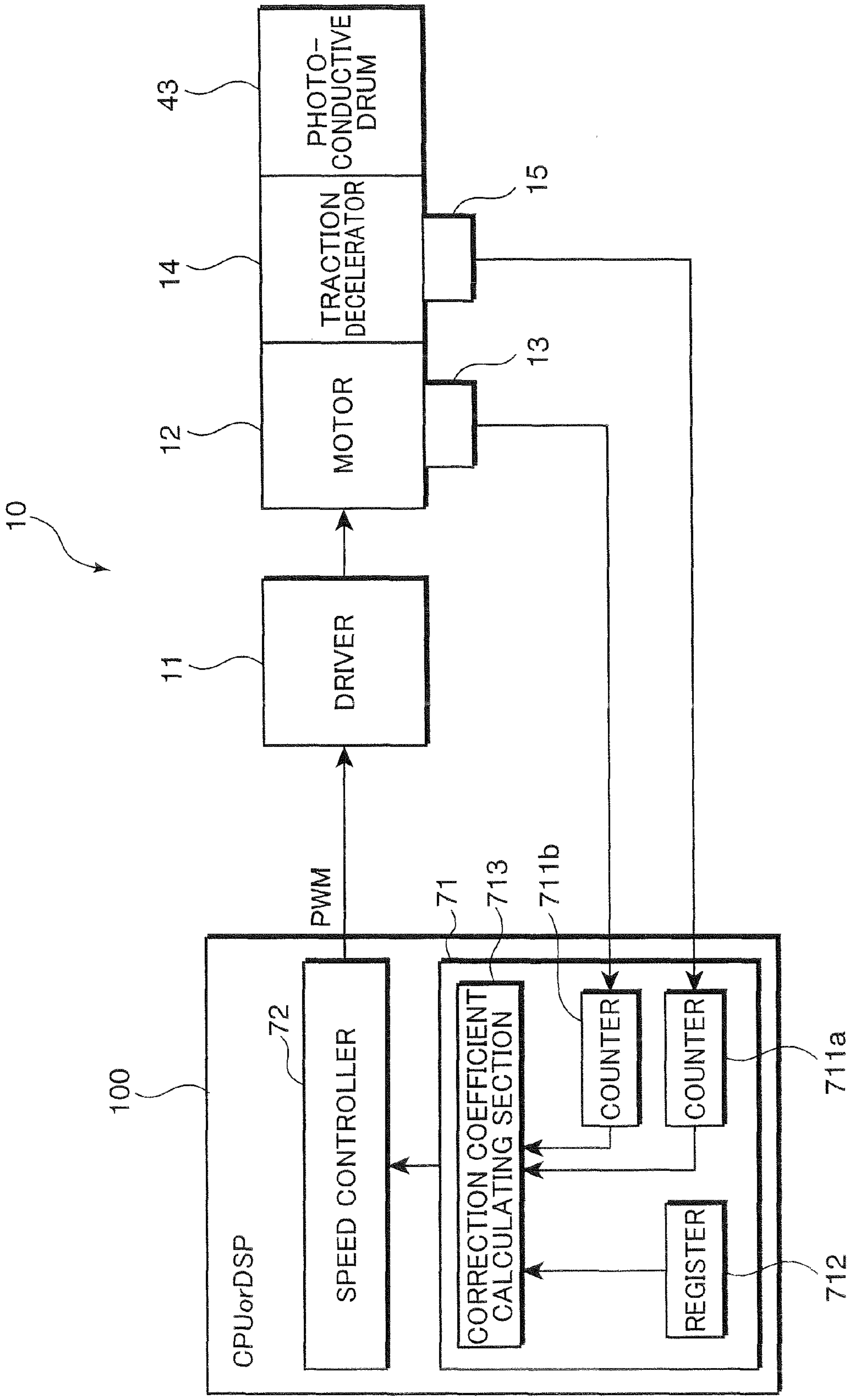
FIG. 2 is a block diagram showing a schematic configuration of a motor drive control device provided in a complex machine.
Figure 3:
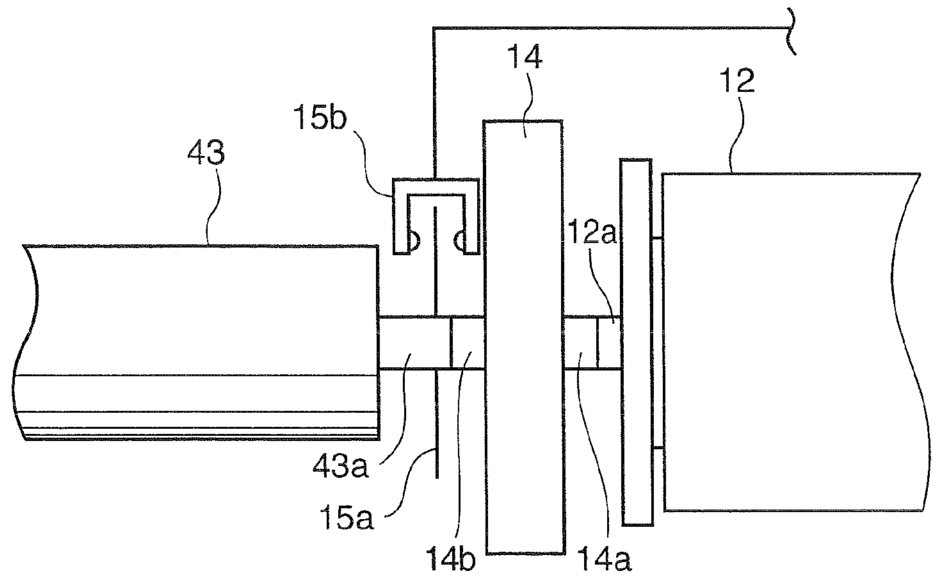
FIG. 3 is a side view showing configurations of a sensor wheel and a sensor of a rotary encoder, which is an example of a drive shaft rotational position detector, a motor, and a photoconductive drum.
Figure 4:
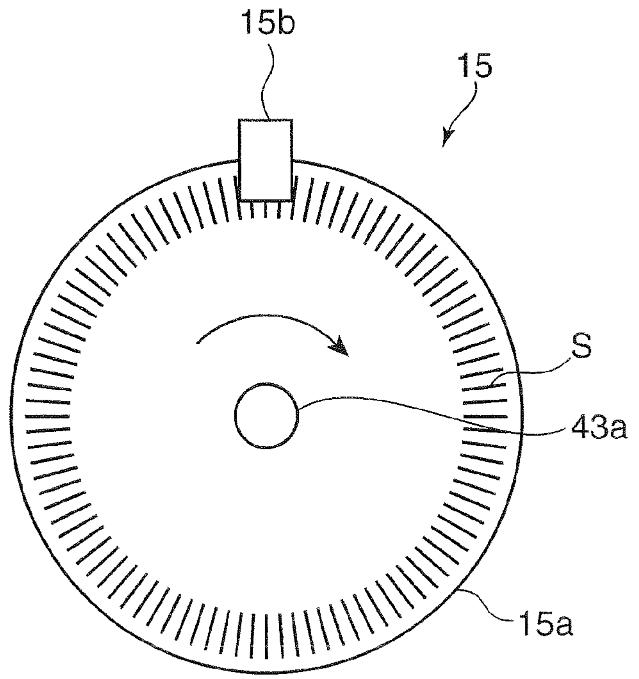
FIG. 4 is a front view showing a configuration of a sensor wheel of the rotary encoder.
Figure 5:
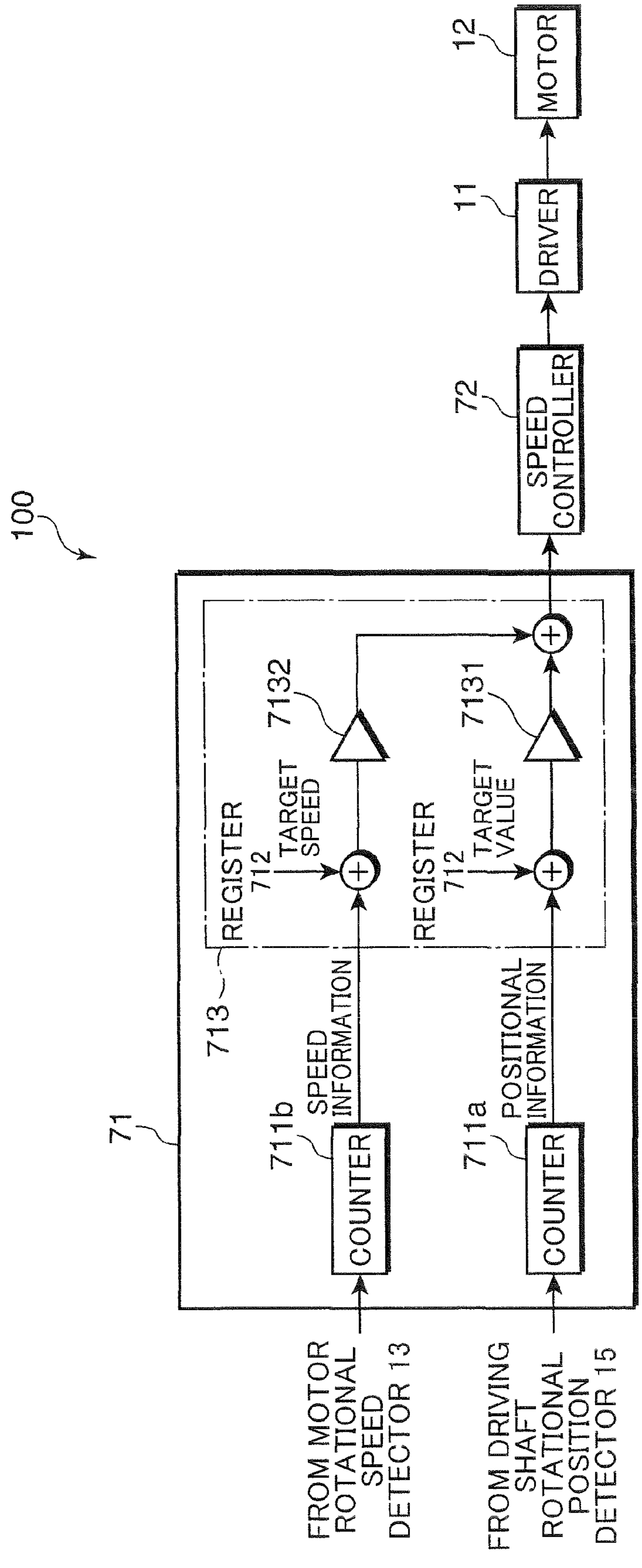
FIG. 5 conceptually shows a configuration of a correction coefficient calculating unit.

FIG. 2 is a block diagram showing a schematic configuration of the motor drive control device provided in the complex machine 1. FIG. 3 is a side view showing configurations of a sensor wheel 15*a* and a sensor 15*b* of a rotary encoder which is an example of an encoder 15, a motor 12, and the photoconductive drum 43. FIG. 4 is a front view showing a configuration of the sensor wheel 15*a* of the rotary encoder. FIG 5 conceptually shows a configuration of a correction coefficient calculating unit 71.

As described above, the motor drive control device 10 is provided for controlling driving of a motor as a rotational drive power source of the photoconductive drum 43 and the transferring roller 41. Since specifications in which the motor drive control device 10 is adopted in drive motors of the photoconductive drum 43 and the transferring roller 41 are the same except for that a normal decelerator instead of a traction decelerator is used for driving of the transferring roller 41, FIG. 2 shows an example of adopting it to the drive motor of the photoconductive drum 43. Hereinafter, the case where the motor drive control device 10 is adopted in the photoconductive drum 43 will be described as an example.

The complex machine 1 includes a motor driver 11, a motor 12, a FG (flux-gate) sensor 13, a traction decelerator 14, an encoder 15, and a controller 100. As described above, the motor drive control device 10 is provided to control driving of the motor 12 as a drive power source for rotating the photoconductive drum 43 and the transferring roller 41.

The motor driver (motor driving means) 11 is a driving mechanism for rotationally driving the motor 12. The motor 12 includes, for example, a stepping motor and a brushless DC motor, and outputs a rotational drive force to the photoconductive drum 43.

The FG (flux-gate sensor) sensor 13 is a frequency generator and includes a rotor as a FG magnet (frequency-generating), and an FG pattern (conductive pattern) formed on a substrate pattern for detecting a magnetic change of a rotor rotation, and these generate an alternate current signal and outputs the same to the correction coefficient calculating unit 71.

The traction decelerator 14 allows a plurality of metal rollers to come in press-contact to decelerate an output of the motor 12, and transmits the output of the decelerated motor 12 to the photoconductive drum 43. The traction decelerator 14 includes a high-speed shaft 14*a* to which a rotational drive force of the motor 12 is inputted from a driving shaft 12*a* of the motor 12, an unillustrated sun roller which is mounted to the high-speed shaft 14*a* concurrently rotatably, a plurality of planetary rollers (unillustrated) which have outer peripheral surfaces in contact with an outer peripheral surface of the sun roller and move around the sun roller while rotating about the sun roller, and an unillustrated carrier which supports the planetary rollers. Further, the traction decelerator 14 includes a low-speed shaft 14*b* which is provided coaxially with the sun roller and outputs a rotational drive force of the motor 12 decelerated by the planetary rollers to a driving shaft 43*a* of the photoconductive drum 43.

The encoder 15 includes, for example, a MR (magnetic) sensor or a rotary encoder. As will be described herebelow, the encoder 15 outputs a detection pulse as a position information to a correction coefficient calculating unit 71 of the CPU 100 at each time when the sensor 15*b* detects slit S formed in a peripheral end of the sensor wheel 15*a*.

The motor 12 is a drive power source which supplies a rotational drive force to the photoconductive drum 43. A rotational drive force of the motor 12 is decelerated by the traction decelerator 14 as described above, and the motor 12 rotates the photoconductive drum 43 at a decelerated motor speed.

The sensor wheel 15*a* of the rotary encoder which is an example of the encoder 15 is mounted to the driving shaft 43*a* of the photoconductive drum 43 and is rotated coaxially with the driving shaft 43*a*. At a part in a periphery of the sensor wheel 15*a*, there is provided the sensor 15*b* including a light-detector. As shown in FIG. 4, in an area which is a peripheral end of the sensor wheel 15*a* and subjected to the sensing performed by the sensor 15*b*, a great number of slit S are formed along the circumferential direction of the sensor wheel 15*a*. The sensor 15*b* includes a light source and a light receiver which are provided at a position sandwiching a line of the slit S. When the light receiver receives a light intermittently through the line of slit S, a detection pulse is outputted to the correction coefficient calculating unit 71.

In the drive force transmitting structure, depending on accuracies of the high-speed shaft 14*a*, the sun roller, the planetary roller, and the low-speed shaft 14*b* of the traction decelerator 14, a connection accuracy between the motor 12 (driving shaft 12*a*) and the high-speed shaft 14*a*, and a connection accuracy between the photoconductive drum 43 (driving shaft 43*a*) and the low-speed shaft 14*b*, a transmission loss may occur when a rotational drive force of the motor 12 is transmitted to the photoconductive drum 43. Therefore, there is a likelihood that a rotational position of the driving shaft 43*a* of the photoconductive drum 43 (in other words, a rotational position of the photoconductive drum 43) does not increase and decrease in a manner accurately corresponding to a change in a peripheral speed of the output shaft 12*a* of the motor 12.

The controller 100 includes a CPU or a DSP (Digital Signal Processor), and performs an overall operational control of the complex machine 1. The controller 100 includes the correction coefficient calculating unit 71 and the speed controller 72.

The correction coefficient calculating unit 71 (1) calculates a correction amount about the motor 12 by amplifying a difference between a rotational speed of the motor detected by the FG sensor 13 and a predetermined target speed at a predetermined gain, (2) calculates a correction amount about the driving shaft 43*a* of the photoconductive drum 43 by amplifying a difference between a rotational position (position) of the driving shaft 43*a* of the photoconductive drum 43 from a reference position and a predetermined target value at a predetermined gain, and (3) calculates a total correction amount which is a sum of the correction amount about the motor 12 and the correction amount about the driving shaft 43*a* of the photoconductive drum 43. The total correction amount is used by the speed controller 72 to generate a PWM control signal.

The correction coefficient calculating unit 71 includes counters 711*a* and 711*b*, a register 712, and a correction coefficient calculating section 713. The counter 711*a* detects the number of pulses from the reference position outputted from the encoder 15 as rotational position information of the driving shaft 43*a* of the photoconductive drum 43. The counter 711*b* detects a frequency by counting a period of alternate current signal outputted from the FG sensor 13 as rotational speed information of the motor 12. The register 712 stores a value of the predetermined target speed about the motor 12 and the predetermined target value about the driving shaft 43*a* of the photoconductive drum 43.

In other words, as shown in FIG. 5, (1) the correction coefficient calculating section 713 calculates rotational position information (position information) of the driving shaft 43*a* of the photoconductive drum 43 in accordance with a count value indicating the number of pulses counted by the counter 711*a* (rotational position information (position information) of the driving shaft 43*a* of the photoconductive drum 43) and a pulse period calculated from the count value counted by the counter 711*a*, and amplifies the difference between the calculated rotational position and the target value about the driving shaft 43*a* of the photoconductive drum 43 stored in the register 712 with use of an amplifying circuit 7131 at a predetermined gain to thereby calculate the correction amount about the driving shaft 43*a* of the photoconductive drum 43. (2) Further, the correction coefficient calculating section 713 calculates the correction amount about the motor 12 by amplifying the difference between a count value indicating the frequency counted by the counter 711*b* (speed information of the motor 12) and the predetermined target value about the motor 12 stored in the register 712 with use of the amplifying circuit 7132 at a predetermined gain. (3) Then, the correction coefficient calculating section 713 calculates the total correction amount which is a sum of the calculated correction amounts, and outputs the total correction amount to the speed controller 72.

In this case, by changing the target speed value about the motor 12 stored in the register 712, or the target value of the rotational position (position) about the driving shaft 43*a* of the photoconductive drum 43, the rotational speed of the driving shaft 43*a* of the photoconductive drum 43 follows in accordance with the changing in the target speed value or the changing in the target value. Accordingly, if the target speed or the target value of the register 712 is changed, the rotational speed of the photoconductive drum 43 (driving shaft 43*a*) can be changed.

The FG sensor 13 and the correction coefficient calculating unit 71 are examples of the motor rotational speed detector of claims, and the encoder 15 and the correction coefficient calculating unit 71 are examples of the driven member rotational position detector of claims. Further, the correction coefficient calculating section 713 (correction coefficient calculating unit 71) is an example of the correction amount calculating section of claims.

The speed controller (speed controller) 72 stores a table which presents a duty ratio corresponding to the total correction amount which is calculated by the correction coefficient calculating section 713. Alternatively, the speed controller 72 calculates the duty ratio corresponding to the total correction amount in accordance with a predetermined calculation formula. The speed controller 72 calculates the duty ratio corresponding to the total correction amount in accordance with the table or the formula, and generates a PWM control signal having the calculated duty ratio in accordance with a reference clock signal. The speed controller 72 outputs the generated PWM control signal as a speed control signal to the motor driver 11. Accordingly, the motor driver 11 controls driving of the motor 12 so that the rotational speed of the output of the motor 12 which is a drive power source of the photoconductive drum 43 becomes the target speed, and the rotational position (position) from the reference position of the driving shaft 43*a* of the photoconductive drum 43 becomes the target value.

The motor drive control device 10 in accordance with the embodiment of the present invention includes the motor driver 11 for the photoconductive drum 43, the FG sensor 13, the encoder 15, and the controller 100. Alternatively, the motor drive control device 10 in accordance with the embodiment of the present invention includes the motor driver for the transferring roller 41, the motor rotational speed detector, the driven member rotational speed detector, and the controller 100.

As described above, in the motor drive control device 10 according to the embodiment of the present invention, the correction coefficient calculating unit 71 calculates the correction amount about the motor 12 in accordance with the difference between the rotational speed of the motor 12 detected by the FG sensor 13 and the target speed, calculates the correction amount about the driving shaft 43*a* of the photoconductive drum 43 in accordance with the difference between the rotational position (position) from the reference position of the driving shaft 43*a* of the photoconductive drum 43 detected by the encoder 15 and the target value, and calculates the total correction amount which is a sum of the correction amounts. Further, the speed controller 72 generates a PWM signal for controlling motors which are drive power sources for the photoconductive drum 43 and the transferring roller 41 in accordance with the calculated total correction amount. Therefore, in the motor drive control device 10, since the rotational position information (position information) of the photoconductive drum 43 or the transferring roller 41 finally subjected to the control executed by the motor drive control device 10 is adopted as a value to be fed back, an operational control accuracy of the photoconductive drum 43 or the transferring roller 41 finally subjected to the control is secured, so that rotational position of the photoconductive drum 43 or the transferring roller 41 in accordance with the rotational speed of the motor 12 can be controlled more accurately as compared to the conventional manner. Further, according to the motor drive control device 10, it becomes unlikely to cause an oscillation at a time of executing a feedback control with respect to the motor 12, the photoconductive drum 43, and the transferring roller 41, so that a stable speed control signal can be generated. Accordingly, the photoconductive drum 43 or the transferring roller 41 can be rotated stably.

The present invention is not limited to the embodiment described above, and various modifications can be made. For example, in the complex machine 1 in which the motor 12 and the motor driver 11 are provided for each of the photoconductive drum 43 and the transferring roller 41, the FG sensor 13 may be provided for the motors 12 which are provided for each of the photoconductive drum 43 and the transferring roller 41, and the encoder 15 may be provided for each of the photoconductive drum 43 and the transferring roller 41. In this case, the correction amount calculating section 713 of the controller 100 calculates the total correction amounts of the photoconductive drum 43 and the corresponding motor 12, and the transferring roller 41 and the corresponding motor 12, in accordance with the rotational speed of the motor 12 detected by the FG sensor 13 and the rotational positions (position) of the photoconductive drum 43 and the transferring roller 41 each detected by the encoder 15. Further, the speed controller 72 of the controller 100 generates speed control signals corresponding to each total correction amounts calculated by the correction amount calculating section 413 and outputs the generated speed control signals to the motor drivers 11 (the motor driver 11 for driving the motor 12 provided for the photoconductive drum 43, or the motor driver 11 for driving the motor 12 provided for the transferring roller 41) corresponding to the respective speed control signals.

As described above, if the controller 100 including the same CPU controls driving of the photoconductive drum 43 and the transferring roller 41, a control of suppressing a positional misalignment can be executed which occurs due to changes in rotational speeds (changes in rotational positions) of the photoconductive drum 43 and the transferring roller 41 in accordance with changes in a load which occurs at a time of contact and release of a recording sheet in a transfer operation at the nip portion formed between the photoconductive drum 43 and the transferring roller 41.

Further, the present invention is not limited to the configuration of the embodiment, and it may be modified in various ways. For example, in the embodiment above, the counter includes the counters 711*a* and 711*b*. The counter 711*a* includes a pulse number detector which detects the number of pulses from the reference position outputted from the encoder 15 as rotational position information (position information) of the driving shaft 43*a* of the photoconductive drum 43. The counter 711*b* includes a frequency detector for measuring a period of an alternate current signal outputted from the FG sensor 13 as rotational speed information of the motor 12 and detecting a frequency. However, it does not limit the pulse number detector or the frequency detector only to a counter. In a case where a timer is adopted as a frequency detector, the register 712 stores a value of a pulse width corresponding to a predetermined target speed of the photoconductive drum 43 in a unit of time.

Further, in the embodiment, the driven member which is driven by the motor drive control device 10 includes the photoconductive drum 43 or the transferring roller 41. However, other driven member may be adopted. For example, in a case where a toner image generated on the photoconductive drum is transferred to a recording sheet through an intermediate transferring belt, a driving roller of the intermediate transferring belt may be the driven member.

In summary, the present invention includes a motor drive control device for controlling a rotational speed of a motor, including: a motor driving section for rotationally driving the motor; a motor rotational speed detector for detecting a rotational speed of the motor; a driven member rotational position detector for detecting a rotational position of a driven member which is rotated by a rotational drive force applied by the motor; a correction amount calculating section for calculating a total correction amount, which is a sum of a correction amount calculated based on a rotational speed of the motor detected by the motor rotational speed detector and a correction amount calculated based on a rotational position of the driven member detected by the driven member rotational position detector; and a speed controller for generating a speed control signal corresponding to a total correction amount calculated by the correction amount calculating section, and outputting the generated speed control signal to the motor driving section.

Further, according to the present invention, the correction amount calculating section calculates the total correction amount by adding up a correction amount calculated by amplifying a difference between a rotational speed of the motor detected by the motor rotational speed detector and a target value at a predetermined gain, and a correction amount calculated by amplifying a difference between a rotational position of the driven member detected by the driven member rotational position detector and a target value at a predetermined gain.

According to the invention, the correction amount calculating section calculates a total correction amount about the rotational speed of the motor giving a rotational drive force to the driven member and the rotational position of the driven member subjected to a control with respect to driving of the motor, and the speed controller generates a speed control signal to be outputted to the motor driving means in accordance with the total correction amount, and the rotational position of the driven member finally subjected to the control by the motor drive control is adopted as a value to be fed back. Accordingly, an operation control accuracy with respect to the driven member finally subjected to a control is secured, and a rotational position of the driven member in accordance with the rotational speed of the motor can be controlled more accurately than the conventional manner.

Further, a speed control signal corresponding to a total correction amount which is a sum of correction amounts calculated from the motor rotational speed and the driven member rotational position added up by the correction amount calculating means is generated by the speed controller, so that an oscillation becomes unlikely to occur at a time of feedback control of the motor and the driven member. Accordingly, a stable speed control signal can be generated. Therefore, according to the present invention, the motor drive control of stably rotating the driven member can be executed.

Further, according to the present invention, a torque ripple and the like which occur alone in a motor and non-linear elements such as slipping and the like which occur at a time of transmitting a rotational drive force from the motor to a driven member (for example, at a time of transmitting a rotational drive force from an output rotational shaft on the side of the motor to the driven member through the traction decelerator) concurrently appears in the rotational shaft of the driven member, the elements can be cancelled in accordance with a rotational position of the driven member detected by the driven member rotational position detector. Accordingly, a rotational ability and a response characteristic of the driven member can be enhanced.

Further, according to the present invention, the driven member rotational position detector is provided with an MR sensor or an encoder, and the motor rotational speed detector is provided with a frequency generator.

According to this invention, the MR sensor or the encoder is provided as the driven member rotational speed detector, and the frequency generator is provided as the motor rotational speed detector. Accordingly, a rotational speed of the driven member and a rotational speed of the motor can be detected accurately.

Further, according to the present invention, a plurality of driven members are provided, and the motor and the motor driving section are provided for each of the plurality of driven members, and the motor rotational speed detector is provided for each motor, and the driven member rotational position detector is provided for each driven member rotated by a rotational drive force applied by a respective motor, and the correction amount calculating section calculates the total correction amount for each set of the driven members and corresponding motors in accordance with a rotational speed of the motor detected by each motor rotational speed detector and a rotational position of the driven member detected by each driven member rotational position detector, and the speed controller generates speed control signals corresponding respectively to the total correction amounts calculated by the correction amount calculating section, and outputs the generated speed control signals to the motor driving sections corresponding to the speed control signals.

According to this invention, the correction amount calculating section and the speed controller including the same CPU make it possible to control driving of the plurality of driven members. Accordingly, it is possible to execute a control of suppressing a disadvantage due to a change in rotational speed (change in rotational position) which occurs in the plurality of driven members.

Further, the present invention includes an image forming apparatus, comprising: an image forming section for transferring a toner image, which is formed on a surface of a photoconductive drum by a charging device, an exposing device, and a developing section, onto a recording medium with a transferring section; a motor for providing a rotational drive force to the photoconductive drum; a motor driving section for rotationally driving the motor; a motor rotational speed detector for detecting a rotational speed of the motor; a driven member rotational position detector for detecting a rotational position of the photoconductive drum which is rotated by a rotational drive force applied by the motor; a correction amount calculating section for calculating a total correction amount, which is a sum of a correction amount calculated based on a rotational speed of the motor detected by the motor rotational speed detector and a correction amount calculated based on a rotational position of the driven member detected by the driven member rotational position detector; and a speed controller for generating a speed control signal corresponding to a total correction amount calculated by the correction amount calculating section, and outputting the generated speed control signal to the motor driving section.

Further, according to the present invention, the rotational drive force applied by the motor is transmitted to the photoconductive drum through a traction decelerator, and the driven member rotational position detector detects a rotational position of the photoconductive drum rotated by a rotational drive force which is applied by the motor and decelerated by the traction decelerator.

Further, the present invention includes an image forming apparatus, including: an forming section for transferring a toner image, which is formed on a surface of a photoconductive drum by a charging device, an exposing device, and a developing section, onto a recording medium with a transferring roller; a motor for providing a rotational drive force to the transferring roller; a motor driving section for rotationally driving the motor; a motor rotational speed detector for detecting a rotational speed of the motor; a driven member rotational position detector for detecting a rotational position of the transferring roller which is rotated by a rotational drive force applied by the motor; a correction amount calculating section for calculating a total correction amount, which is a sum of a correction amount calculated based on a rotational speed of the motor detected by the motor rotational speed detector and a correction amount calculated based on a rotational position of the transferring roller detected by the driven member rotational position detector; and a speed controller for generating a speed control signal corresponding to a total correction amount calculated by the correction amount calculating section, and outputting the generated speed control signal to the motor driving section.

Further, according to the present invention, the rotational drive force applied by the motor is transmitted to the transferring roller through a decelerator, and the driven member rotational position detector detects a rotational position of the transferring roller which is rotated by a rotational drive force applied by the motor and decelerated by the decelerator.

According to the invention, the correction amount calculating section calculates a total correction amount of correction amounts in accordance with a rotational speed of a motor giving a rotational drive force to a photoconductive drum as a driven member (or any of a transferring roller and a driving roller of an intermediate transferring belt, hereinafter referred to as a photoconductive drum and the like) and a rotational position of the photoconductive drum and the like subjected to a control of driving of the motor, and the speed controller generates a speed control signal to be outputted to the motor driving section in accordance with the total correction amount, and a rotational position of the photoconductive drum and the like finally subjected to a control by the motor drive control is adopted as a value to be fed back, so that an operation control accuracy of the photoconductive drum and the like finally subjected to the control is secured, and a rotational position of the photoconductive drum and the like in accordance with the rotational speed of the motor can be controlled more accurately than the conventional manner.

Further, a speed control signal corresponding to a total correction amount which is a sum of correction amounts calculated based on the motor rotational speed and the rotational position of the photoconductive drum and the like added up by the correction amount calculating section is generated by the speed controller, so that an oscillation becomes unlikely to occur at a time of executing a feed back control of the motor and the photoconductive drum and the like. Accordingly, a speed control signal can be generated stably. Therefore, according to the present invention, a motor drive control capable of stably rotating the photoconductive drum and the like is possible.

Further, according to the present invention, a torque ripple and the like which occur alone in a motor and non-linear elements such as slipping and the like which occur at a time of transmitting a rotational drive force from the motor to the photoconductive drum and the like (for example, at a time of transmitting a rotational drive force from an output rotational shaft on the side of the motor to the photoconductive drum through the traction decelerator) concurrently appears in the rotational shaft of the driven member, the elements can be cancelled in accordance with a rotational position of the photoconductive drum and the like detected by the driven member rotational position detector. Accordingly, a rotational ability and a response characteristic of the driven member can be enhanced.

Further, according to the present invention, the motor and the motor driving section are provided for each of the photoconductive drum and the transferring roller, and the motor rotational speed detector is provided in each of the motors provided in the photoconductive drum and the transferring roller, and the driven member rotational position detector is provided in each of the photoconductive drum and the transferring roller, and the correction amount calculating section calculates the total correction amount of the photoconductive drum and the motor corresponding to the same, and the transferring roller and the motor corresponding to the same, in accordance with a rotational speed of each motor detected by the motor rotational speed detector and a rotational position of each of the photoconductive drum and the transferring roller detected by the driven member rotational position detector, and the speed controller generates speed control signals corresponding to the total correction amounts calculated by the correction amount calculating section, and outputs the generated speed control signals to the motor driving section corresponding to the speed control signals.

According to this invention, the correction amount calculating section and the speed controller including the same CPU can control driving of the photoconductive drum and the transferring roller. Accordingly, a control of suppressing a positional misalignment can be executed which occurs due to changes in rotational speeds (changes in rotational positions) of the photoconductive drum and the transferring roller in accordance with changes in a load which occurs at a time of contact and release of a recording sheet in a transfer operation at the nip portion formed between the photoconductive drum and the transferring roller.

This application is based on Japanese Patent application serial No. 2007-229189 filed in Japan Patent Office on Sep. 4, 2007, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A motor drive control device for controlling a rotational speed of a motor, comprising:
- a motor driving section for rotationally driving the motor;
- a motor rotational speed detector for detecting a rotational speed of the motor;
- a driven member rotational position detector for detecting a rotational position of a driven member which is rotated by a rotational drive force applied by the motor;
- a correction amount calculating section for calculating a total correction amount, which is a sum of a correction amount calculated based on a rotational speed of the motor detected by the motor rotational speed detector and a correction amount calculated based on a rotational position of the driven member detected by the driven member rotational position detector; and
- a speed controller for generating a speed control signal corresponding to a total correction amount calculated by the correction amount calculating section, and outputting the generated speed control signal to the motor driving section.

2. The motor drive control device according to claim 1, wherein the correction amount calculating section calculates the total correction amount by adding up a correction amount calculated by amplifying a difference between a rotational speed of the motor detected by the motor rotational speed detector and a target value at a predetermined gain, and a correction amount calculated by amplifying a difference between a rotational position of the driven member detected by the driven member rotational position detector and a target value at a predetermined gain.

3. The motor drive control device according to claim 1, wherein the driven member rotational position detector is provided with an MR sensor or an encoder, and the motor rotational speed detector is provided with a frequency generator.

4. The motor drive control device according to claim 1, wherein:
- a plurality of driven members are provided, and
- the motor and the motor driving section are provided for each of the plurality of driven members, and
- the motor rotational speed detector is provided for each motor, and
- the driven member rotational position detector is provided for each driven member rotated by a rotational drive force applied by a respective motor, and the correction amount calculating section calculates the total correction amount for each set of the driven members and corresponding motors in accordance with a rotational speed of the motor detected by each motor rotational speed detector and a rotational position of the driven member detected by each driven member rotational position detector, and the speed controller generates speed control signals corresponding respectively to the total correction amounts calculated by the correction amount calculating section, and outputs the generated speed control signals to the motor driving sections corresponding to the speed control signals.

5. An image forming apparatus, comprising:

an image forming section for transferring a toner image, which is formed on a surface of a photoconductive drum by a charging device, an exposing device, and a developing section, onto a recording medium with a transferring section;

a motor for providing a rotational drive force to the photoconductive drum;

a motor driving section for rotationally driving the motor;

a motor rotational speed detector for detecting a rotational speed of the motor;

a driven member rotational position detector for detecting a rotational position of the photoconductive drum which is rotated by a rotational drive force applied by the motor;

a correction amount calculating section for calculating a total correction amount, which is a sum of a correction amount calculated based on a rotational speed of the motor detected by the motor rotational speed detector and a correction amount calculated based on a rotational position of the driven member detected by the driven member rotational position detector; and a speed controller for generating a speed control signal corresponding to a total correction amount calculated by the correction amount calculating section, and outputting the generated speed control signal to the motor driving section.

6. The image forming apparatus according to claim 5, wherein the rotational drive force applied by the motor is transmitted to the photoconductive drum through a traction decelerator, and the driven member rotational position detector detects a rotational position of the photoconductive drum rotated by a rotational drive force which is applied by the motor and decelerated by the traction decelerator.

7. An image forming apparatus, comprising:

an forming section for transferring a toner image, which is formed on a surface of a photoconductive drum by a charging device, an exposing device, and a developing section, onto a recording medium with a transferring roller;

a motor for providing a rotational drive force to the transferring roller;

a motor driving section for rotationally driving the motor;

a motor rotational speed detector for detecting a rotational speed of the motor;

a driven member rotational position detector for detecting a rotational position of the transferring roller which is rotated by a rotational drive force applied by the motor;

a correction amount calculating section for calculating a total correction amount, which is a sum of a correction amount calculated based on a rotational speed of the motor detected by the motor rotational speed detector and a correction amount calculated based on a rotational position of the transferring roller detected by the driven member rotational position detector; and a speed controller for generating a speed control signal corresponding to a total correction amount calculated by the correction amount calculating section, and outputting the generated speed control signal to the motor driving section.

8. The image forming apparatus according claim 7, wherein the rotational drive force applied by the motor is transmitted to the transferring roller through a decelerator, and the driven member rotational position detector detects a rotational position of the transferring roller which is rotated by a rotational drive force applied by the motor and decelerated by the decelerator.

9. The image forming apparatus according to claim 7, wherein:

the motor and the motor driving section are provided for each of the photoconductive drum and the transferring roller, and the motor rotational speed detector is provided in each of the motors provided in the photoconductive drum and the transferring roller, and the driven member rotational position detector is provided in each of the photoconductive drum and the transferring roller, and the correction amount calculating section calculates the total correction amount of the photoconductive drum and the motor corresponding to the same, and the transferring roller and the motor corresponding to the same, in accordance with a rotational speed of each motor detected by the motor rotational speed detector and a rotational position of each of the photoconductive drum and the transferring roller detected by the driven member rotational position detector, and the speed controller generates speed control signals corresponding to the total correction amounts calculated by the correction amount calculating section, and outputs the generated speed control signals to the motor driving section corresponding to the speed control signals.

* * * * *